UNITED STATES PATENT OFFICE.

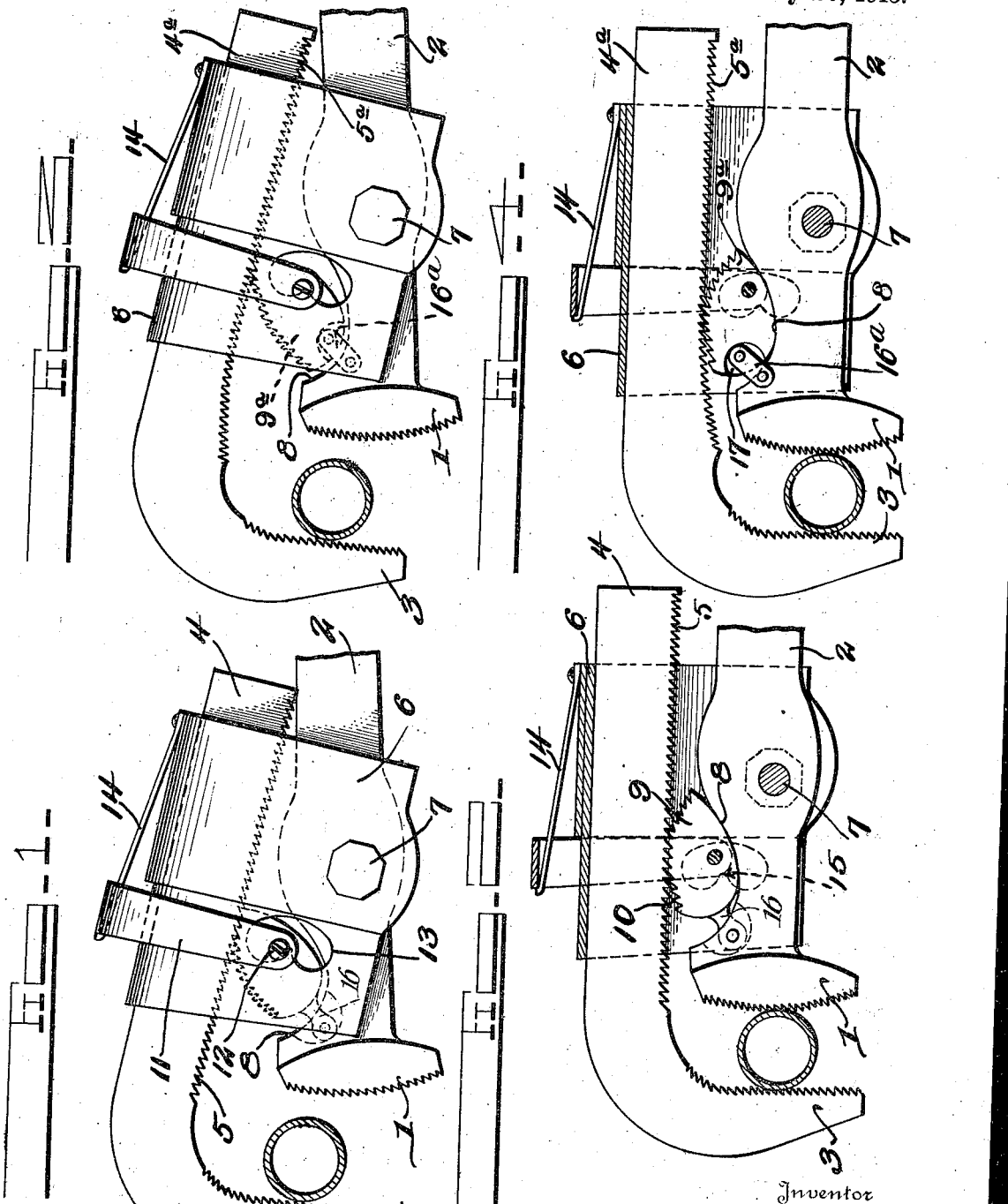

CHARLES THOM, OF WASHOE, MONTANA.

WRENCH.

1,147,462.         Specification of Letters Patent.        Patented July 20, 1915.

Application filed September 4, 1914.   Serial No. 860,163.

*To all whom it may concern:*

Be it known that I, CHARLES THOM, a citizen of the United States, residing at Washoe, in the county of Carbon and State of Montana, have invented new and useful Improvements in Wrenches, of which the following is a specification.

This invention relates to improvements in tools and more particularly to pipe wrenches.

It is the object of this invention to provide a pipe wrench with a sliding outer jaw adjustable relatively to the jaw carried upon the handle and slidably connected thereto by a toothed pivoted dog.

The advantages of this wrench are that it is readily adjustable to pipes of different sizes, will grip the pipe firmly without crushing, and is readily detachable from the pipe.

While the preferred forms of this invention are illustrated upon the accompanying sheet of drawing, yet it is to be understood that minor detail changes may be made without departing from the scope thereof.

Figure 1 is a view in side elevation of an embodiment of this invention about to be adjusted to engage a pipe. Fig. 2 is a similar view, with parts broken away, gripping a pipe. Fig. 3 is a view similar to Fig. 1 of a modification. Fig. 4 is a view similar to Fig. 2 of this modification.

In carrying out this invention, as illustrated in Figs. 1 and 2 the inner jaw 1 is carried upon the outer end of the handle 2. The outer jaw 3 is carried upon a shank 4 which is provided upon its under side with a plurality of teeth 5, the forward edges of which are perpendicular to the shank and the rear edges inclined. The shank 4 is mounted to slide in the closed upper portion of a housing 6 which is open at the bottom and whose sides embrace the sides of the handle 2 and is pivotably secured to the handle by a bolt 7 passing through the sides and handle at a point below and to the rear of the center of the housing sides. The upper portion of the handle 2 within the housing 6 and adjacent the jaw 1 is provided with a curved cut-out portion 8 within which oscillates a toothed dog 9 about a pivot upon the handle at the forward portion of the dog. The upper portion of the dog 9 is curved and provided with a plurality of teeth 10 adapted to engage the teeth 5 of the shank. The teeth of the dog are normally held in engagement with the shank by a strap 11 passing over the top of the housing and along each side having a pin 12 passing through apertures 13 in the sides of the housing and through the dog 9, which strap is normally held in its uppermost position by a spring 14 upon the top of the housing. The rear edges of the apertures 13 of the housing walls are formed in a continuous outward curve while the forward edges or those adjacent the jaw 1 are provided with a reëntrant central projection 15 to limit the rearward movement of the housing 6 upon its pivot 7 by the projection 15 engaging the under side of the pin which is connected to the strap through the dog.

The dog 9 being pivoted at its forward end withdraws the outer jaw upon downward pressure on the handle and as its teeth are arranged on a curve eccentric to its pivot point, the spring pressed strap will normally retain the teeth upon its surface furthest from its pivot point in engagement with the shank. In the form shown on Figs. 1 and 2, the dog 9 is pivoted to the handle by a projection 16 therefrom entering a central cutout in the upper side of the handle and the teeth 5 on the shank 4 are arranged in a straight line.

In the modification illustrated upon Figs. 3 and 4 the dog 9ª is pivoted upon a rigid extension 16ª from the handle extending within cutouts 17 upon the dog and the teeth 5ª of the shank 4ª are arranged upon a curve so that even in the closed position of the outer jaw the teeth on the curved upper surface of the dog will engage the shank. The outer jaw 3 is readily adjustable by hand as an inward manual movement will cause the teeth upon the shank to ride over the spring controlled dog and an outward manual movement may be accomplished upon depressing the top of the spring controlled dog engaging strap. To engage a pipe with the wrench the handle is grasped in the hand, the strap is pushed down by the thumb of that hand and the outer jaw engaged with the pipe, the thumb is then raised releasing the spring controlled dog, and while the outer jaw is held in engagement with the pipe the inner jaw is brought in contact with the inner side of the pipe by forcing the handle in its direction, the shank sliding over the spring controlled dog, and the pipe is firmly gripped by bearing down on the handle which will exert a downward pull upon the housing pivot and cause an upward movement of the inner jaw which causes an eccentric rearward movement of the dog in relation to the housing pivot that will withdraw the outer jaw to firmly grip the pipe against the inner jaw. By the formation of the dog with the teeth on the curved upper surface it will always engage the shank and while the pressure exerted upon the pipe will be great enough to grip it firmly the pressure created by the bearing down upon the handle is not at any time great enough to crush the pipe.

What I claim is:—

A wrench comprising a handle, a fixed jaw thereon, a housing pivoted to the handle below and to one side of the center of the housing, a movable jaw, a shank thereon guided between the housing and handle, a plurality of teeth upon the side of the shank adjacent the handle, a dog having a curved surface provided with teeth adapted to engage the teeth of the shank pivoted to the handle within the housing, a strap about the top of the housing, a pivot pin passing through the dog and the ends of the strap, apertures provided for the passage of said pivot pin in the sides of the housing, and a spring acting upon the strap for normally holding the dog in engagement with the shank, said pivot pin apertures in the housing sides provided with reëntrant projections adapted to engage the strap pivot pin to limit the movement of the housing about its handle pivot.

CHARLES THOM.

Witnesses:
 THAD C. POUND,
 BERNARD H. McGUIRE.

Copies of this patent may be obtained for five cents each, by addressing the "Commissioner of Patents, Washington, D. C."